United States Patent Office 3,365,465
Patented Jan. 23, 1968

3,365,465
PROCESS FOR THE PREPARATION OF SUBSTITUTED MERCAPTO 9-THIABICYCLONONANES
Sheldon B. Greenbaum, Tonawanda, N.Y., assignor to Hooker Chemical Corporation, Niagara Falls, N.Y., a corporation of New York
No Drawing. Filed Nov. 30, 1965, Ser. No. 510,662
5 Claims. (Cl. 260—327)

ABSTRACT OF THE DISCLOSURE

A process for the preparation of a compound of the formula

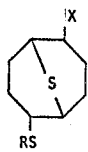

wherein X is a halogen, and wherein R is selected from the group consisting of alkyl of 1 to about 20 carbon atoms; aryl of 6 to about 18 carbon atoms; substituted alkyl of 1 to about 30 carbon atoms wherein the substituents are selected from the group consisting of fluorine, chlorine, bromine, iodine, aryl and substituted aryl wherein the substituents on said aryl are selected from the group consisting of fluorine, chlorine, bromine, iodine, alkyl, and the substituted alkyl hereinbefore described; and substituted aryl of 1 to about 30 carbon atoms, wherein the substituents on said aryl are as hereinbefore described. In said process, a compound of the formula

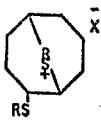

is heated at a temperature of from about 100 degrees centigrade to about 300 degrees centigrade.

The compounds produced by the process of this invention are useful as chemical intermediates.

---

The present invention is concerned with the novel process for the preparation of substituted mercapto 9-thiabicyclononanes which involves the heating of the corresponding sulfonium salts at elevated temperatures.

In accordance with the present invention, there is provided a process for the preparation of the compounds of the formula

which comprises heating the compounds of the formula

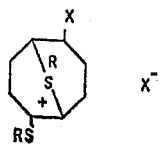

at a temperature of from about 100 degrees centigrade to about 300 degrees centigrade wherein R is a radical selected from the group consisting of alkyl, aryl, substituted alkyl and substituted aryl, and X is a halogen atom.

Normally, the heating is continued until the sulfonium salts decompose into a mercaptothiabicyclononane and a halide of the formula RSX.

Among the R radicals encompassed herein are alkyl from 1 to 20 carbon atoms and preferably of from 1 to about 12 carbon atoms, such as methyl, ethyl, propyl, butyl, amyl, octyl, decyl, dodecyl, pentadecyl, eicosyl, as well as their various isomer forms, such as isopropyl and isobutyl, said alkyl radical being a monovalent radical derivable from an aliphatic hydrocarbon alkane by the removal of one hydrogen atom; substituted alkyl from 1 to about 30 carbon atoms and preferably of from 1 to about 15 carbon atoms, said alkyl group being substituted by one or more halogen, aryl, substituted aryl, and the like, as well as their various isomer forms. The designation aryl represents an aromatic structure containing from 6 to about 18 carbon atoms and preferably from 6 to about 10 carbon atoms, such as benzene, naphthalene, anthracene, and the like. The aryl group can be substituted by alkyl or substituted alkyl, as defined herein. Examples of halogen include chlorine, bromine, fluorine and iodine.

Solvents can be employed if desired to facilitate the reaction such as organic and inorganic solvents like organic acids, water, dioxane, glycols, e.g., alkylene glycols, ethers, e.g., dialkylethers, tetrahydrofuran and the like. Specific examples of the solvents include benzoic acid, ethylene glycol, propylene glycol, dimethylether, diethylether, and the like.

Illustrative examples of the novel starting reactants employed which are the subject of the copending application and the products produced by the process of the present invention include among others, for example the following:

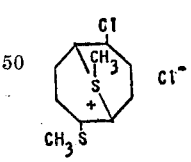

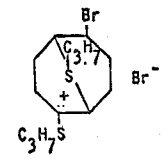

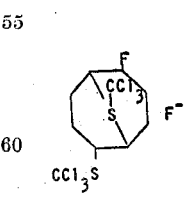

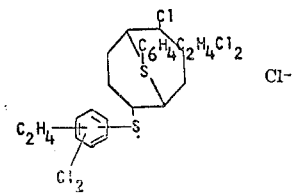

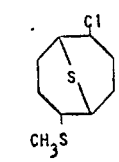
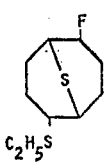
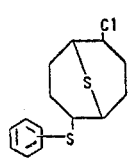
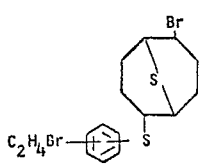
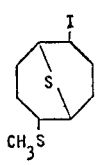

The novel sulfonium salts utilized as reactants in the process of the present invention are the subject matter of a copending application. Generally, these novel sulfonium salts are prepared by the reaction of a cyclo-octadiene with a sulfenyl halide at reduced temperatures.

The compounds of this invention are useful as chemical intermediates, as pesticides and fungicides. Specifically, the reaction sequence for the preparation of a phosphorus insecticide is illustrated by the following equations:

I.
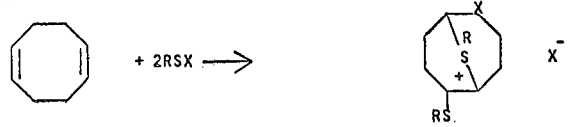

II.
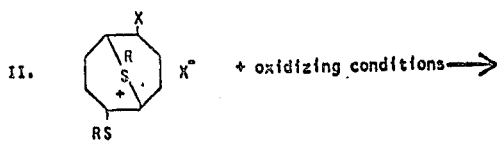

III.
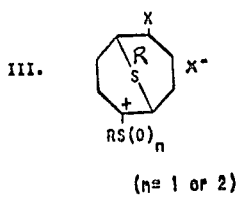

IV.
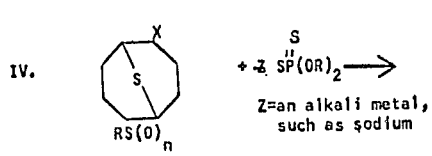

The product produced in Equation IV is useful as an insecticide.

The product can be separated from the reaction medium by a number of methods, such as crystallization, extraction, filtration, gas chromatography, and the like.

Distillation is particularly advantageous where the alkyl or aryl halide boils near or below the decomposition temperature, since under these conditions it distills out leaving the desired product as a residue. By the use of reduced pressures, this advantage can be extended to cases where higher boiling allyl or aryl halide decomposition products are formed.

The following examples are presented to further illustrate the invention but are not intended to limit its scope. Unless specified otherwise, all temperatures are in degrees centigrade and all parts are by weight.

Other useful phosphite derivatives may be obtained by decomposing the unoxidized sulfonium salt to the 2-halomercaptothiabicyclonone and then reacting this product with

This last step is shown by Reaction IV where $n=0$.

*Example 1.—Preparation of 2-chloro-6-methylsulfonyl-9-thiabicyclo[3.3.1]nonane*

2 - chloro - 4-methylsulfonyl-9-methylthiabicyclo[3.3.1] nonanium chloride was gradually heated to 155 degrees centigrade. At this temperature the melting began to effervesce as it lost methylchloride. When the bubbling had ceased, the residue was cooled and taken up in a minimum of benzene. Dilution hexane offered a colorless crystalline product which was further crystallized from a mixture of glyme (ethylene glycol dimethyl ether) and hexane. The product had a melting point at 105–106 degrees centigrade.

*Analysis.*—Calculated for $C_9H_{15}ClO_2S_2$: Cl, 13.9 percent; S, 25.1 percent. Found: Cl, 12.7 percent; S, 25 percent.

*Example 2.—Preparation of 2-chloro-6-methylmercapto-9-thiabicyclo[3.3.1]nonane*

Fifty grams of 2-chloro-4-methylmercapto-9-methylthiabicyclononanium chloride were demethochlorinated by heating to 160 degrees centigrade. The residue was carefully sublimed to give a white crystalline product which was recrystallized from hexane and melated at 37–39 degrees centigrade.

*Analysis.*—Calculated for $C_9H_{15}ClS_2$: Cl, 15.9 percent; S, 28.8 percent. Found: Cl, 15.9 percent; S, 28.8 percent.

In a manner similar to those of Examples 1 and 2, that is, utilizing the reaction conditions and procedures of those examples with corresponding reactants, the following compounds were prepared:

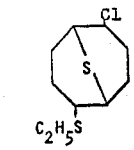
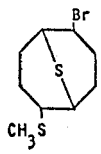

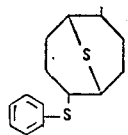
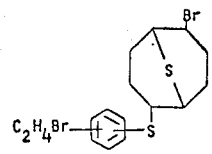

*Example 3*

Effectiveness in destroying Mexican bean beetles and mites was established by applying the compound

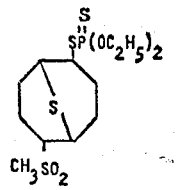

to about 50 to 100 adult mites and about 10 to about 25 Mexican bean beetles at various concentrations. The numbers of dead insects were counted. The results were as follows, after 24 hours.

| Mexican bean beetles, percent mortality | 100 | 100 | 100 | 100 |
|---|---|---|---|---|
| Mites, percent mortality | 100 | | | 100 |
| Concentration, percent | 0.1 | 0.05 | 0.025 | .01 |

Similarly, the corresponding derivatives, tested in the same manner, give substantially the same results. These derivatives include, among others:

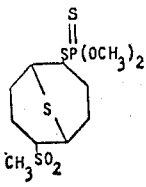
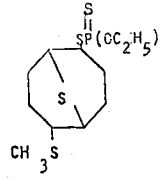

With a control, 0% concentration, zero percent mortality was recorded with mites and Mexican bean beetles.

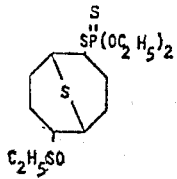
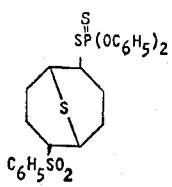

While there have been described various embodiments of the invention, the compositions and methods described are not intended to be understood as limiting the scope of the invention as it is realized that changes therewithin are possible, and it is further intended that each element recited in any of the following claims is intended to be understood as referring to all equivalent elements for accomplishing substantially the same results in substantially the same or equivalent manner, it being intended to cover the invention broadly in whatever form its principles may be utilized.

What is claimed is:

1. A process for the preparation of a compound

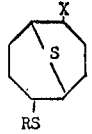

which comprises heating a compound

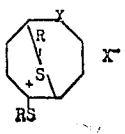

at a temperature of from about 100 degrees centigrade to about 300 degrees centigrade until the desired product results wherein R is selected from the group consisting of alkyl of 1 to about 20 carbon atoms; aryl of 6 to about 18 carbon atoms substituted alkyl of 1 to about 30 carbon atoms wherein the substituents are selected from the group consisting of fluorine, chlorine, bromine, iodine, aryl, and substituted aryl, wherein the substituents on said aryl are selected from the group consisting of fluorine, chlorine, bromine, iodine, alkyl, and the substituted alkyl described herein and substituted aryl of 1 to about 30 carbon atoms, wherein the substituents on said aryl are as hereinbefore described and X is a halogen atom.

2. A process in accordance with claim 1 wherein the product RX is evolved and driven off during the decomposition thereby resulting in its separation from the desired product.

3. A process in accordance with claim 1 wherein R is alkyl and X is chlorine.

4. A process in accordance with claim 2 wherein the product

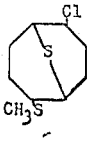

is produced.

5. A process in accordance with claim 3 wherein the product is separated from the reaction medium by crystallization.

References Cited
UNITED STATES PATENTS 3,270,034  8/1966  Greenbaum _____ 260—327

WALTER A. MODANCE, *Primary Examiner.*

J. A. PATTEN, *Examiner.*